United States Patent [19]

Larsson

[11] 4,129,484
[45] Dec. 12, 1978

[54] PROCESS FOR REGENERATION OF SPENT REACTION SOLUTIONS

[75] Inventor: Karl-Georg Larsson, Trollhättan, Sweden

[73] Assignee: KemaNord AB, Stockholm, Sweden

[21] Appl. No.: 794,699

[22] Filed: May 6, 1977

[30] Foreign Application Priority Data

May 11, 1976 [SE] Sweden .................. 7605372

[51] Int. Cl.² .............................. C25B 1/26
[52] U.S. Cl. ........................ 204/101; 704/103; 704/104
[58] Field of Search ................. 204/101, 103, 104

[56] References Cited

U.S. PATENT DOCUMENTS

| 2,810,686 | 10/1957 | Adamer et al. | 204/104 |
| 3,135,673 | 6/1964 | Tirrell et al. | 204/103 |
| 3,523,755 | 8/1970 | Mc Rae | 204/104 |

FOREIGN PATENT DOCUMENTS

| 803831 | 4/1951 | Fed. Rep. of Germany. |
| 1324549 | 3/1963 | France. |
| 1310438 | 3/1973 | United Kingdom. |

Primary Examiner—R. L. Andrews
Attorney, Agent, or Firm—Fred Philpitt

[57] ABSTRACT

This invention relates to a process for working up residual solutions from a reactor, in which chlorate (i.e. sodium chlorate) is reduced to chlorine dioxide in the presence of an acid.

6 Claims, 6 Drawing Figures

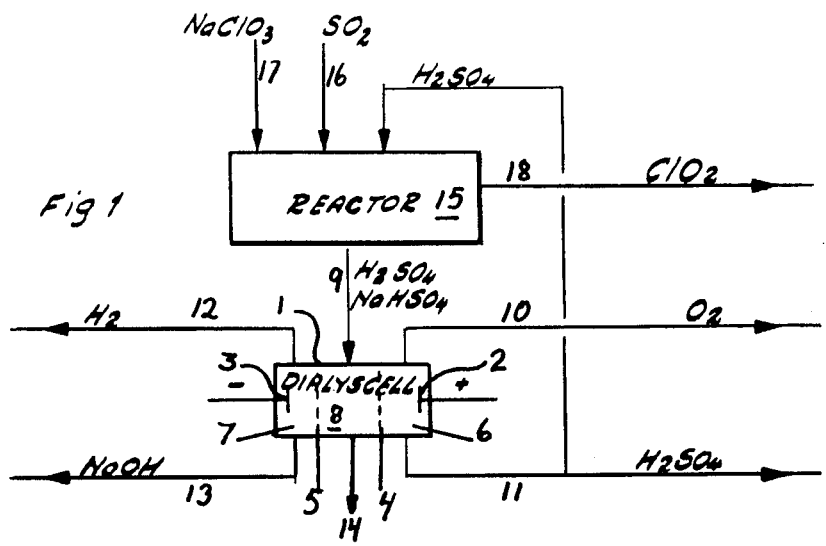
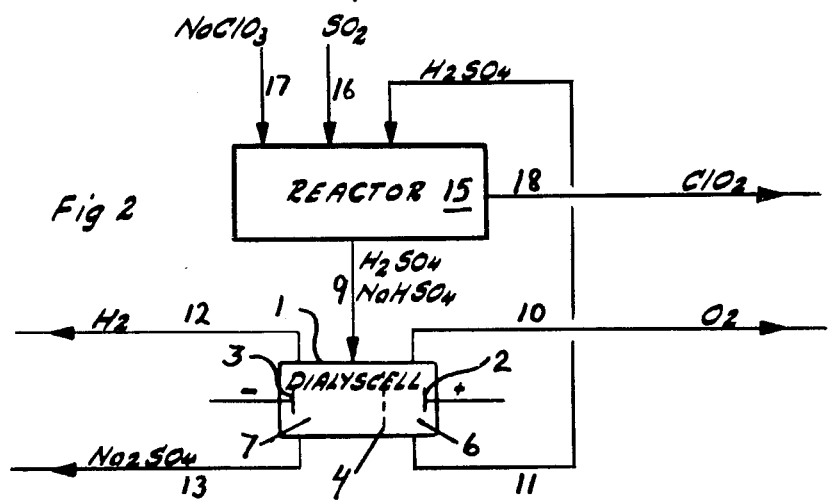
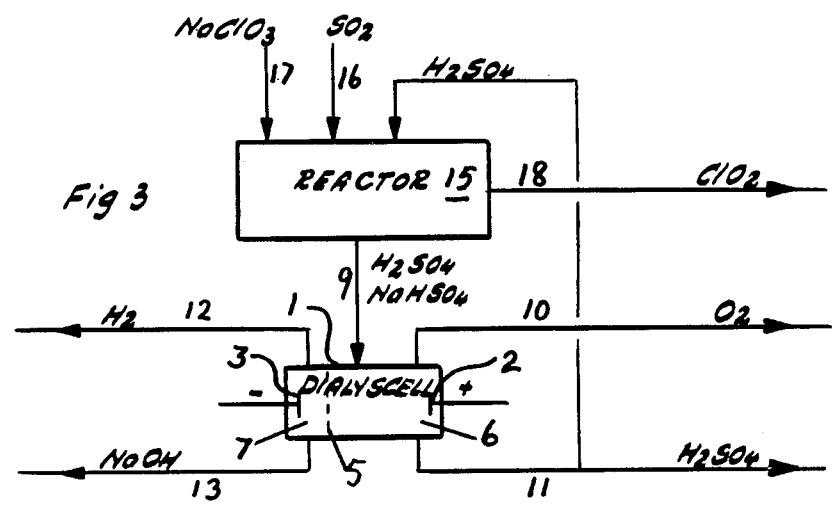

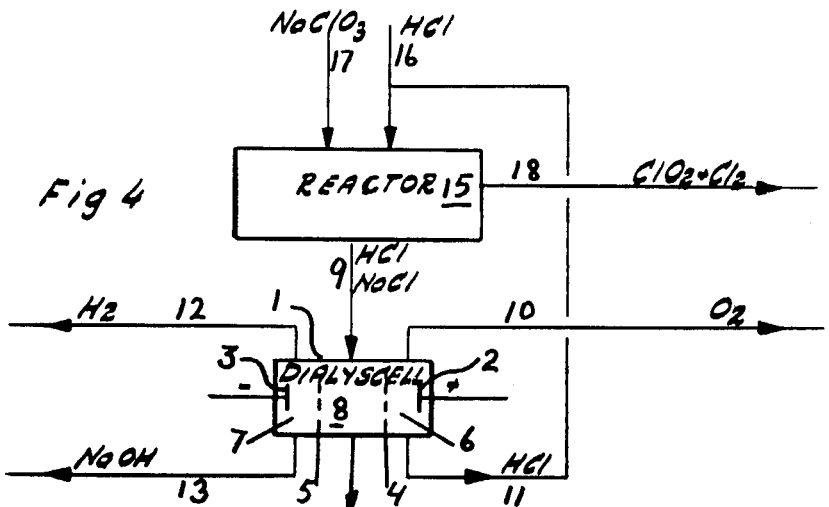
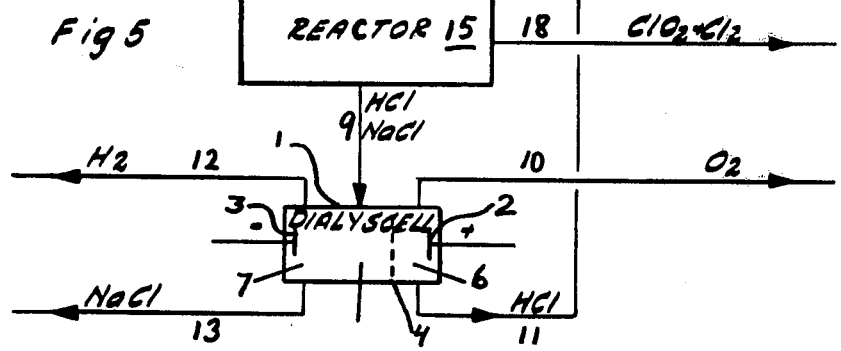
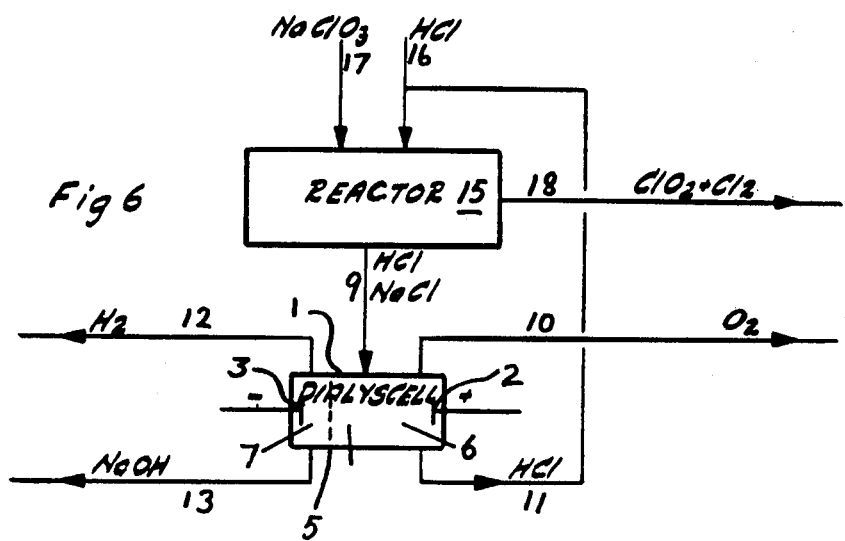

PROCESS FOR REGENERATION OF SPENT REACTION SOLUTIONS

BACKGROUND

Chlorine dioxide is an oxidation agent, and an important use thereof is as a bleaching agent in the cellulose industry, where it is the most common bleaching agent in the final stages.

There is a general trend to an increased use of chlorine dioxide at the expense of other bleaching agents, especially hypochlorite and chlorine. One can, i.a., note an increased admixture of chlorine dioxide also in the introductory stage, favorable synergistic effects being obtained.

Since cellulose plants use large amounts of sodium hydroxide for washing, and since the preparation of chlorine is connected to the preparation of sodium hydroxide through the chlorine alkali process, the reduced use of chlorine involves either a risk of a deficit of sodium hydroxide or an increased price thereof.

Normally chlorine dioxide is prepared by reduction of chlorate, and the most common processes for this can be summarized in the following gross formulas:

$$2\ NaClO_3 + SO_2 \rightarrow 2\ ClO_2 + Na_2SO_4 \qquad \text{I.}$$

(the Mathieson process)

$$2\ NaClO_3 + CH_3OH + H_2SO_4 \rightarrow 2\ ClO_2 + HCOOH + H_2O + Na_2SO_4 \qquad \text{II.}$$

(the Solvey process)

$$NaClO_3 + NaCl + H_2SO_4 \rightarrow ClO_2 + \tfrac{1}{2}\ Cl_2 + H_2O + Na_2SO_4 \qquad \text{III.}$$

(the Rapson R-2-process, see the Canadian patent specification No. 543 589)

Thus, the reducing agent in these processes is sulphur dioxide, methanol and chloride ion respectively. Other reducing agents, such as chromic acid or nitrogen oxides have also been tested, but principally due to their higher prices they have not been commercially utilized to a considerable degree.

All these processes take place with an excess of a strong acid, usually sulphuric acid, and therefore the spent liquor of the reactor will consist of sodium sulphate in strong sulphuric acid or, if desired, sodium hydrogen sulphate in strong sulphuric acid.

It is essential from an economical as well as environmental point of view that this liquor be utilized.

Previously this liquor has been disposed of in the sewage system. However, the most usual thing has been to use it as "make up" in the cellulose plant, but in that case its content of sulphuric acid has not been utilized and chemicals have been necessary for its neutralization. Sometimes its high content of sulphuric acid has made it useful for other purposes, e.g., in the plant for resin cooking.

Increasingly rigorous environmental demands and rules for the washing of gases from boilers and evaporators and increased closing of the drainage systems of the plants have in many cases reduced the need of make up so much that the reactors will produce an excess of sodium sulphate and sulphuric acid which can not be disposed of in the sewage system.

Therefore great efforts have been made to make use of the liquor in another way.

By using a combined reactor/evaporator the sulphuric acid can be retained in the reactor and only solid sodium sulphate be withdrawn, i.e., the least possible amount of by-product for this process (the Rapson R-3-process, see the Swedish patent specification No. 312 789).

By replacing the addition of sodium chloride and part of the addition of sulphuric acid with hydrochloric acid, which, however, is a more expensive chemical substance than sulphuric acid, the produced amount of sodium sulphate can be additionally reduced.

However, these processes still produce the difficultly usable sodium sulphate, and therefore it has been suggested to convert this into sodium chloride and sulphuric acid:

$$Na_2SO_4 + 2\ HCl \rightarrow 2\ NaCl + H_2SO_4 \qquad \text{IV.}$$

(The Rapson R-4-process)

Thus this process requires another reactor system after the chlorine dioxide reactor to recover sulphuric acid, and then the sodium chloride product is still not made useful.

A similar result, i.e., a sodium chloride containing liquor, is obtained if the chlorate reduction is carried out merely with hydrochloric acid:

$$NaClO_3 + 2\ HCl \rightarrow ClO_2 + \tfrac{1}{2}\ Cl_2 + H_2O + NaCl \qquad \text{V.}$$

If in this process, like in the previous ones, one tries to achieve a high degree of conversion of the chlorate by means of a high acid content, some problems with the following side reactions will occur:

$$NaClO_3 + 6\ HCl \rightarrow 3\ Cl_2 + NaCl + 3\ H_2O$$

(see the Canadian patent specification No. 920 773)

which will increase with increasing concentration of chloride ion, and partly with the spent liquor, which due to the high price of hydrochloric acid must not go to waste or due to its acidity cannot be economically worked up to chlorate in an electrolytic cell, either, as the solution must first be electrolytically neutralized.

Therefore processes of this kind (see the Swedish patent specifications Nos. 155 759 and 337 007) operate with a low acid content, which permits electrolytic regeneration of the liquor to chlorate. In return these processes require a long residence time for the reaction between chlorate and hydrochloric acid and, consequently, several and big reactors. A high temperature is also used to increase the conversion rate, which beings increased risks of explosion, the mastering of which requires an increased number of apparatuses and process-technical compromises.

Thus, to sum up, both purely chemical regeneration trials by the addition of reagents as well as regeneration trials by electrolysis of residual solutions from chlorine dioxide reactors have so far caused problems seriously restricting the usefulness of the bleaching chemical agent chlorine dioxide, which is very valuable per se. Problems have arisen both in acidification with sulphuric acid and with hydrochloric acid, which acids have so far been predominant.

THE PRESENT INVENTION

My invention avoids the above-mentioned problems and shows a way to work up residual solutions from chlorine dioxide reactors.

My invention relates to a process, in which residual solutions are led to an electrolytic cell, at the anode region of which an acid enriched fraction of the residual solution is prepared.

According to a preferred embodiment of the invention the acid enriched, removed fraction is recycled to the chlorine dioxide reactor for repeated use as acidifying agent.

According to another preferred embodiment of the invention the used electrolytic cell is provided with at least one, and possibly many ion selective membranes to simplify and to improve the enrichment and to increase the freedom of choice in the process.

Contrary to previous working up trials using electrolysis, chlorate is consequently not prepared according to the invention, but the electrolytic cell is adjusted so that decomposition of water takes place at the anode, hydrogen ions being released, which form an acid enriched fraction of the residual solution together with anions migrating to the anode.

This different procedure brings a series of advantages in connection with working up of residual solutions from chlorine dioxide reactors, which have previously separately or, alternatively, in combination not been available for utilization.

In comparision with working up of the residual solution to chlorate the advantage is obtained by my invention that an anode reaction, water decomposition, is utilized, which requires a lower cell voltage than the development of chlorine gas, which means that this reaction can be more easily realized with a high selectivity and which is not an inessential advantage in respect of energy economy.

As the decomposition of water in principle only requires the presence of water and a charge carrier at the anode, this reaction can be realized to a high degree depending on the composition as well as the concentration of the electrolyte.

Accordingly a high degree of option as to the acid content in the reactor is possible, since the decomposition of water by a suitable choice of cell voltage, current density, choice of electrode material, mixture and current conditions at the electrode surface can be made to take place within a very broad spectrum of pH-values, from strongly acidic to alkaline ones.

Contrary to electrolytic working up for the preparations of chlorate, which must be carried out within a relatively narrow space in the alkaline range, this means that the acid content in the reactor, if desired, can be selected high to obtain a high reaction velocity at small reactor volumes and explosion safe temperatures, quite without compromising respect to the subsequent electrolytic process.

Thanks to my invention a high degree of option is also obtained with respect to the other reactants in the reactor. Thus, the used acid need not be sulphuric acid or hydrochloride acid but other strong acids can be selected, since useful acids in this connection seldom cause problems at the following water decomposition. Also mixtures of different acids can be permitted. For the same reason the reducing agent used can be selected very freely and need not be restricted to those so far used. Chloride ions need, e.g., not be present in the residual solution which is of course necessary at working up to chlorate. Nor is it necessary that the reduction to chlorine dioxide be carried out by addition of a chemical reducing agent, but the invention can be used as well for a possible electrolytic reduction of the chlorate in the presence of an acid. The invention also allows freedom of choice in respect of the cation included in the chlorate. This can, e.g., consist of alkali or earth alkali metal.

Through the invention there is also a great freedom of choice regarding concentrations, temperature and degree of conversion of the chlorate in the reactor, as well as the type of reactor and the end products. The decomposition of water can be achieved within wide concentration ranges for the substances in the residual solution and within wide temperature ranges. The content of chloride ions may, e.g., without detriment to the electrolytic process be maintained on a low level to avoid the side reaction that was discussed above in connection with the hydrochloric acid reduction. If the chlorate should not be completely converted in the reactor the remaining chlorate ions tend to migrate towards the anode region in the following electrolytic process and accompany the acid enriched fraction of the residual solution back to the reactor. Also normally used catalytic ions will return to the reactor in this way.

Another advantage of this invention is that the cathode reaction accompanying the water decomposition at the anode can be selected with great freedom. If the cell is completely lacking membranes or only contains one or more non-ion selective diaphragms, the cathode process will be defined by the cations present in the residual solution. Usually this means that a fraction of the residual solution neutralized or possibly alkalized by development of hydrogen gas will be withdrawn from the cathode region whereas the acid enriched fraction is withdrawn at the anode region. In this case the freedom of choice will thus be restricted in the cathode process to a choice of suitable cations in the electrolyte. If instead the electrolytic cell in accordance with the preferred embodiment of the present invention is provided with one or more ion selective membranes the freedom of choice will, however, increase as possibly added types of ions to the cathode compartment or their reaction products can be retained. This means that reducing reactions other than development of hydrogen gas can be carried out economically in the cathode compartment by a suitable selection of electrolytic parameters and substances present. The possiblity of producing sodium hydroxide at the cathode is especially valuable in connection with cellulose bleaching as this chemical agent is required in the cellulose process and there is a strong need, as mentioned above, of being able to produce this chemical agent independently of chlorine.

In addition to the advantage of an increased freedom of choice as to cathode process, the ion selective membranes provide several other advantages. In comparison with conventional diaphragms the ion selective membranes are as a rule thinner and allow of a more compact cell construction with small spaces between the electrodes, the voltage drop in the electrolyte being reduced with an improved energy yield as a result. The ion selective membranes prevent the formed ions from migrating back and prevent mixing of the electrolytes in the anode and cathode compartments with undesired ion types, side reactions being avoided, which results in an improved electron yield.

The end products will also be more pure, which increases their usefulness. This possiblity of pure end products is of special importance when, as in the case of sodium hydroxide, the cathode product is intended to be introduced into the cellulose process. As a rule the residual solutions from chlorine dioxide reactors contain chloride ions, and difficult corrosion problems would occur in the equipment of the cellulose process if the sodium hydroxide used should be materially contaminated by these ions.

Finally, the invention will provide a great freedom of choice as to the degree of the working up the residual solution. In the simplest case, using a cell without membranes but with withdrawal of fractions at the anode and cathode regions of only slightly concentrated solutions, the invention means that a possibly neutralized fraction of the residual solution, and consequently a fraction that is partly rendered harmless from an environmental point of view, can be led from the cathode region to waste while an acid enriched and more useful fraction of the residual solution can be withdrawn. If the working is carried further, and a more advanced cell is used with ion selective membranes, the invention allows in the other extreme case a total working up of the residual solution to pure disposable product flows, or ones useful in the process, and no residual fraction at all that need be disposed of in the sewage system.

Thus, to sum up, the enumerated advantages mean that the established basic problem, i.e., working up of residual solutions from chloride reactors, can be solved by means of the invention with a maximum of adaptation to varying reactor processes, reactor types, reaction substances and process conditions and with a minimum of influence on the existing process or process equipment. Accordingly, the invention can be optimally adapted to local conditions in respect of process, available raw materials, product needs from the cathode process and demands on working degree, with a minimum of extra equipment.

The invention will now be described more in detail in connection with the attached drawings, where FIGS. 1–3 schematically show examples of the invention used with a chlorine dioxide process utilizing sulphuric acid for acidification and sulphur dioxide as reducing agent, while FIGS. 4–6 show the invention used with a process utilizing hydrochloric acid for the acidification and chloride ions as reducing agent.

FIGS. 1 and 4 show the use of an anion selective and a cation selective membrane.

FIGS. 2 and 5 show the use of only one anion selective membrane and

FIGS. 3 and 6 show the use of only one cation selective membrane.

The embodiments shown in the figures relate to variants of the invention especially preferred for various reasons and in different connections.

In the figures corresponding details have been provided with the same reference numerals.

The working up cell consists of an electrolytic vessel 1, which in the applications according to the figures is of a conventional design but might also be given another geometrical design, e.g., to prevent back-mixing of the product flows when these are withdrawn from a reactor without membranes.

The constructive design of the cell compartments actuate the compositon and quality of the withdrawn product flows. In the case when the cell is completely lacking membranes the product flows should be withdrawn in the neighborhood of a cathode and an anode at such an adjusted rate that the ions formed at the electrodes substantially accompany the respective product flows and are not considerably mixed with the rest of the electrolyte. Only if this is done can product flows of a different composition be withdrawn, which are not mixed with incoming residual solution in too high a degree. Even when the cell is provided with conventional diaphragms, it should be designed in known manner and the product flows be withdrawn in such a way that a loss of product ions by back migration will not arise. As the cell is provided with ion selective membranes the mixture of the cell compartment solutions is negligible. However, in this case it may be desirable to model the cell compartments in such a way that when passing a solution through the cell compartment a successive depletion and enrichment respectively of ion type is obtained so that the solution will have a continuously changed composition between inlet and outlet. This can be achieved in known manner by providing the cell compartment with such a cross section thata substantially laminar flow without back-mixing is obtained.

The reference numeral 2 refers to an anode and 3 refers to a cathode, which should be selected according to their resistence to the electrolyte, occurring overpotentials and desired mixing effects. The material of the anode may be noble metal, noble metal oxide, graphite or titanium or another suitable material. The material of the cathode may be stainless steel or another suitable material. Possibly the anode and the cathode may be designed as gas electrodes, viz, porous electrodes making it possible to introduce a depolarizing gas, or as electrodes through which liquid can pass.

4 is an anion selective membrane and 5 is a cation selective membrane. In the embodiments according to the figures not more than two ion selective membranes are utilized in a cell, these being of different ion selectivity, the anion selective membrane defining the anode compartment and the cation selective membrane the cathode compartment. However, more advanced types of cells with more membranes, optionally in another order, are possible in other desired cell processes. The used membranes should be selected with respect to a good selectivity to the included ions, the selectivity to hydrogen and hydroxyl ions of course being of special interest for processes according to the invention. The membranes used may for instance be of the molecular screen type, ion exchange type or possibly salt bridge type, homogeneous or heterogeneous.

An anode compartment is designated by 6, a cathode compartment by 7 and an intermediate compartment by 8. The electrolyte can be pumped around in the compartments with separate pumps for each compartment or led through only once and then withdrawn.

The supply line for residual solution has the reference numeral 9, while 10 and 11 are the oxygen gas and the enriched acid respectively withdrawn at the anode and 12 and 13 are the hydrogen gas and cathode product respectively developed at the cathode. As mentioned above other cathode processes are possible, in which no gaseous hydrogen need be developed. Different supply lines may be required as well in other possible cell processes or in case of using gas electrodes.

The residual flow from the intermediate compartmnt is designated by 14 and contains substantially only water in an advanced electrolysis.

As no appreciable diffusion of water through the ion selective membranes takes place and no material flow containing water is supplied to the anode compartment, the amount of water required to withdraw an acid with a desired concentration at 11 should be supplied to the anode compartment through a special conduit, e.g., by supply of the whole or parts of the flow 14. However, no such conduit has been shown in the drawings.

The acid flow 11 is led to the chlorine dioxide reactor 15 together with a flow 16 of reducing agent and a chlorate flow 17. A chlorine dioxide conduit 18 in addition to the conduit 9 for residual solution leads from the reactor.

All the conduits can of course in known manner be provided with the necessary valves, discharge and supply lines, supply tanks, control means, etc.

Thus, in FIGS. 1–3 the reactor reaction proceeds according to the reaction formula 1 above. This method of preparing chlorine dioxide from sulphur dioxide, sulphuric acid and sodium chlorate and a residual liquor of sulphuric acid and sodium sulphate has a number of advantages. Sulphur dioxide as well as sulphuric acid are cheap chemicals. Moreover, sulphur dioxide is often produced locally by cellulose industries. The sulphur dioxide is oxidized to sulphate and forms no gaseous rest that may accompany the chlorine dioxide product, which is valuable when a pure chlorine dioxide is desired. The sulphur dioxide is completely converted and will cause in comparison with chloride ions less side reactions impairing the yield, and therefore the contents of acid and sulphur dioxide can be kept on a high level without disadvantage at the conversion. Nor does the sulphate ion formed cause any side reactions in the chlorate. In comparison with chloride ions the sulphate ion causes much less corrosion in reactor, electrolytic cell as well as in the cellulose process. This means a simplified material choice, which is an advantage not the least in connection with the electrodes. In this process part of the residual solution can be used as "make up" in the cellulose process. In electrolytic working up the resistance of the sulphate ion to oxidation results in that the water decomposition can be easily brought about with a great selectivity. Furthermore, the big sulphate ion is easily retained by membranes.

In FIG. 1 sodium chlorate is supplied to the chlorine dioxide reactor 15 at 17, sulphur dioxide at 16 and sulphuric acid at 11, from which a flow of chlorine dioxide is withdrawn at 18 and a flow of residual solution of sodium sulphate and sulphuric acid at 9, which flow 9 is supplied to the electrolytic vessel.

By means of an anion selective membrane 4 next to the anode 2 and a cation selective membrane 5 next to the cathode 3 the electrolytic vessel 1 is divided into three compartments, i.e., the anode compartment 6, the cathode compartment 7 and the intermediate compartment 8. The flow 9 of residual solution is fed to the intermediate compartment 8.

When voltage is applied to the cell sulphate ions will migrate from the intermediate compartment through the membrane 4 into the anode compartment 6. At the anode water is decomposed, a flow 10 of oxygen gas leaving the vessel, while hydrogen ions remain and form together with the migrated sulphate ions the enriched acid which is withdrawn at 11 and recycled to the reactor 15.

The cations present in the intermediate compartment 8, mainly sodium and hydrogen ions, migrate through the membrane 5 and cause development of hydrogen gas at the cathode 3, which hydrogen gas is withdrawn at 12. In the beginning the present hydrogen ions are principally reduced in this way, but gradually decomposition of water will take place also here and leave hydroxyl ions in an amount equivalent to the migrated sodium ions so that a solution of sodium hydroxide can be withdrawn from the cathode compartment 7 at 13.

If the reaction is brought so far that no solution contaminated by ions need be withdrawn from the intermediate compartment 8, an amount of sodium hydroxide equivalent to the batch amount of chlorate added to the reactor is thus obtained at the cathode and at the anode an amount of sulphuric acid equivalent to the batch amount of sulphur dioxide added (cf. formula I) plus the amount of sulphuric acid being present in the residual solution. As the sulphur dioxide forms sulphuric acid in this way and as only the originally present amount of sulphuric acid need be recirculated to the reactor, a by-product flow of sulphuric acid can be withdrawn for sale or another use, as is indicated by the branch pipe on the conduit 11 in the figure.

The cell according to FIG. 2 is provided with only one anion selective membrane 4. Here the residual solution is introduced into the cathode compartment 7. The anode process will be the same as that according to FIG. 2. As before development of hydrogen gas 12 takes place at the cathode which leads to neutralization of the solution in the cathode compartment so that a waste solution 13 of sodium sulphate can be withdrawn. Thus the cell process accoring to this figure is not driven so far as in FIG. 1, but in this case a reduced amount of waste consisting only of sodium sulphate is obtained and no excess acid from the anode compartment 6. If desired, the reaction can of course be driven further, a sodium hydroxide solution contaminated by sodium sulphate being obtained from the cathode compartment 7 and a by-product flow of sulphuric acid from the recirculation conduit 11 for sulphuric acid.

The cell according to FIG. 3 is provided with only one cation selective membrane. Here the residual solution 9 is introduced into the anode compartment 6. The anode and cathode processes will be substantially the same as in the process according to FIG. 1, but the flow 11 of sulphuric acid from the anode compartment will here be somewhat contaminated by sodium sulphate. This cell will tend to get an impaired efficiency in comparison with the previous ones, as hydrogen ions formed at the anode 2 cannot be prevented from migrating to the cathode 3 and there be reduced. Also in this case the reaction can of course be driven differently far all according to local desiderata.

In FIGS. 4–6 the reactor reaction proceeds according to formula V in the earlier part of the specification. Thus, chlorine dioxide, chlorine gas, water and sodium chloride are prepared from hydrochloric acid and sodium chlorate. Also this process has many advantages making it especially advantageous to utilize the invention on this process in certain connections. Several existing chlorine dioxide reactors are of this type due to the fact that — as discussed above — one has tried to master by means of this process the problem with residual solutions in another way than by the process according to the present invention. Hydrochloric acid is a relatively cheap chemical substance and is both reducing agent and acidification agent in this process, and therefore only chlorate and hydrochloric acid need be added to the reactor. The chloride ion is oxidized to chlorine, which like the chlorine dioxide has a bleaching ability, and if this property is utilized the chlorine product thus contributes to obtaining a large amount of bleaching chemicals. As mentioned above, an advantageous synergestic effect is obtained in certain cases when using chlorine dioxide and chlorine together in bleaching. When working up the residual solution according to the present invention it is true that certain development of chlorine takes place parallelly to the development of oxygen gas in the anode compartment, but this product gas of oxygen and some chlorine can be led to the flow of bleaching gas from the chlorine dioxide reactor and will thus eke out that further. Contrary to the electrolytic enrichment of sulphuric acid no by-product acid is obtained that need be taken charge of.

In FIG. 4 flows of sodium chlorate 17 and hydrochloric acid 16 are supplied to the reactor 15 and a product flow 18 of chlorine dioxide and chlorine gas is withdrawn. The residual solution is led via conduit 9 to the electrolytic cell.

By means of an anion selective membrane 4 next to the anode 2 and a cation selective membrane 5 next to the cathode 3 the electrolytic cell is divided into three compartments, i.e., the anode compartment 6, the cathode compartment 7 and the intermediate compartment 8. The flow 9 of residual solution is transferred to the intermediate compartment 8.

Chloride ions from the intermediate compartment 8 migrate in the applied voltage field through the membrane 4 and form together with hydrogen ions released at the anode 2 a product flow 11 enriched with hydrochloric acid, which is recycled to the reactor. The formed oxygen gas is withdrawn at 10. The cations of the residual solution migrate through the membrane 5 and form a sodium hydroxide flow 13 and a hydrogen gas flow 12 in the same way as in the case with sulphuric acid. A water solution free of ions can be withdrawn from the intermediate compartment at 14, if the water content of the residual solution has not also passed into the anode and cathode compartments.

The cell in FIG. 5 contains an anion selective membrane 4 and the flow 9 of residual solution is led to the cathode compartment. The cloride ions migrate through the membrane and form together with hydrogen ions prepared in the anode compartment the enriched acid. In the cathode compartment 7 the residual solution is neutralized to a waste flow of sodium chloride 13, which in this case may possibly be further worked up in a chlorate cell or chlorine cell.

The cell according to FIG. 6 has only one cation selective membrane 5 and the flow 9 of residual solution is led to the anode compartment 6. The cations of the residual solution migrate through the membrane 5 and form as before sodium hydroxide. At the anode hydrochloric acid is enriched which can be withdrawn at 11, possibly contaminated by sodium chloride, and recycled.

In these processes the working up can be carried differently far in the same way as in the case with sulphuric acid with corresponding consequences. However, in the cases with hydrochloric acid the consumed reducing agent does not form, as mentioned above, any anion remaining in the residual solution, and therefore no by-product acid is obtained in any of the processes according to FIGS. 4–6.

Finally the possibility of introducing another cation selective membrane between the anion selective membrane and the anode in the cell with three compartments discussed above should be emphasized. In this case the anions present in the residual solution will migrate towards the anode as before, pass the anion selective membrane but be prevented from reaching the anode compartment by the cation selective membrane. The hydrogen ions produced in the anode compartment will migrate towards the cathode, pass the cation selective membrane but be prevented from further migration through the anion selective membrane. Thus the anions as well as the hydrogen ions will remain between the two membranes and form the acid there that can be withdrawn. In this way the anode chamber will be free of the anions of the residual solution, which can be an advantage if it is desired to add other substances in the anode compartment for other purposes or if one wants to avoid side reactions to the water decomposition at the anode, e.g., development of chlorine gas, as chloride ions are present in the residual solution.

At the chlorate reduction in the reactor 15 chlorine dioxide is obtained within wide limits on the process conditions. The chlorate content in the reaction solution can vary between 0.05 N and 10 N. The maximum conversion degree of the chlorate is obtained at the maximum values of the acid content, but the resulting residual solution from the reactor will then be very acid. To evade a more comprehensive neutralization of the residual solution in the process of the present invention a lower content of acid is preferred. The lower conversion degree of the chlorate will then not deteriorate the process economy to any considerable degree as according to the above non-converted chlorate ions will migrate towards the anode in the following electrolytic working up and accompany the enriched acid back to the reactor. Thus it is possible within the scope of the invention to supply to the electrolytic vessel residual solutions having an acid content of 5 N or more, but the economy of the process is improved if the solution is neutral or slightly acidic. Preferrably the pH-value of the solution is between 1 and 7 and most preferred between 3 and 7.

It should be observed that the residual solution can be neutral or slightly acidic even if the acid content in the reactor is high. The above-mentioned Rapson R-3-process produces, e.g., for preparation of chlorine dioxide only a solid, neutral sodium sulphate in spite of a considerable acid content in the reactor, and if this sodium sulphate is to be residual solution the latter will be almost neutral.

The reducing agent is supplied to the reactor in amounts equivalent to the amount of chlorate added in batches. If the reducing agent is added in the form of sodium chloride this may be present in a content of 0.01–4M. A chloride ion content exceeding the chlorate content by more than about twice leads in too high a degree to the side reaction discussed above, at which chlorine gas is formed instead of chlorine dioxide. If the reducing agent is sulphuric acid the content can be chosen more freely, but also in this case too large excesses of reducing agent should be avoided.

The temperature in the reactor may be anywhere between the freezing point of the reaction solution and an upper limit, which is defined by the decomposition of the chlorine dioxide and the risk of explosion and which is normally not put higher than 100° C. In order to simplify the separation of the chlorine dioxide gas the higher temperatures are often chosen.

The pressure in the reactor is normally atmospheric pressure, but a slight negative pressure can be applied to facilitate the evaporation of the chlorine dioxide gas or to evaporate the solution by boiling at lower temperatures. Normally inert gas is also led through the reactor to evaporate the chlorine dioxide and to hold down its partial pressure at explosion-safe values, preferably below 100 mm Hg.

The reaction can be carried out in a tank reactor, a series of tank reactors or in a tube reactor.

The acid content of the residual solution may vary between neutral or slightly acidic and about 5 M, as mentioned above. After the variations of concentration in the reactor its content of salt can vary between 0.01 and 6 M.

The design of the electrolytic cell has been discussed above. According to the preferred embodiment the anode compartment has an acid content which is enough to provide the desired acid content there at recycling to the reactor.

Examples of different working up tests of residual solutions will be reported below, which, however, are not intended to be restricting for the required scope of protection.

EXAMPLE 1

A cell with three compartments, where the cathode compartment was separated by a cation selective membrane and the anode compartment by an anion selective one, was fed in the intermediate compartment with a mixture of sodium sulphate and sulphuric acid (a normal spent liquor from a chlorine dioxide reactor). With a current amount of 999,000 As, 2.01 mole sulphuric acid were obtained from the anode compartment and from the cathode compartment 0.96 mole soda lye. After finished test the solution of the intermediate compartment contained 0.01 mole hydrogen ion and 0.0016 mole sodium ion.

EXAMPLE 2

When repeating the test in order to test the purity of the sulphuric acid the latter was found to contain 11 ppm sodium ion.

EXAMPLE 3

In a cell with two compartments with an anion selective diaphragm the cathode compartment was fed with spent liquor from the reactor. The solution was electrolyzed until a neutral sodium sulphate was present in the cathode compartment. At a consumed current amount of 1,040,000, As, 2.39 mole sulphuric acid were obtained from the anode compartment.

EXAMPLE 4

In a cell with two compartments, where the anode compartment was separated by an anion selective membrane, 1 liter of a residual solution consisting of 150 g NaCl/l and $10^{-2}$ M HCl was circulated through the cathode compartment and 1 liter of a 0.1 M HCl solution through the anode compartment. After supply of 121,320 As, the catholyte was 0.8 M in respect of NaOH and the anolyte 0.6 in respect of HCl.

EXAMPLE 5

In a cell with two compartments, where the cathode compartment was separated by a cation selective membrane 1 liter of a residual solution according to example 4 was circulated through the anode compartment, while 1 liter of a 0.1 M NaOH solution was circulated through the cathode compartment. After a current supply of 114,120 As, the catholyte was 0.9 M in respect of NaOH.

EXAMPLE 6

In a cell with three chambers, where the anode compartment was separated by an anion selective membrane and the cathode compartment by a cation selective membrane 1 liter of a residual solution according to example 4 was circulated through the intermediate compartment while 1 liter of a 0.1 M NaOH solution was circulated through the cathode compartment and 1 liter of a 0.1 M HCl solution through the anode compartment. After a current supply of 108,000 As, a solution was obtained in the cathode compartment that was 1.07 M in respect of NaOH and in the anode compartment a solution that was 0.53 M in respect of HCl.

The invention is not restricted to the embodiments and examples described above but can be varied in different ways within the scope of the following claims.

In addition to the variants apparent from the text a plurality of possibilities of development can be suggested.

It is, e.g., quite in accordance with the invention to let the system be included in enlarged, integrated systems.

Thus the hydrogen gas from the cathode compartment can be used with advantage for burning, for syntheses (e.g., hydrochloric acid, optionally with the aid of by-product chlorine formed in the process) of in future fuel cells.

The oxygen gas from the anode compartment can be used as dilution gas in the reactor, occurring by-products being made useful and no separate cleaning of the gas being necessary.

Another alternative is utilizing the gas after purification in future fuel cells or, if the plant has bleaching with oxygen gas, utilizing the gas for enrichment of the air to the oxygen plant.

Formed sodium hydroxide can be used together with chlorine dioxide for the preparation of chlorite.

In the case when methanol is used as reducing agent in the reactor and the residual solution contains formaldehyde it is possible to separate the formaldehyde from the flow coming from the electrolytic cell by distillation and then possibly by addition of hydrogen gas, possibly from the cathode process, to reduce the formaldehyde to methanol for repeated use as reducing agent in the reactor.

I claim:

1. A process for manufacture of chlorine dioxide by contacting and mixing in a reaction zone an alkali or alkali earth metal chlorate with sulfuric acid and/or hydrochloric acid in the presence of water and a reducing cathode or a reducing agent for the chlorate such as sulfur dioxide, chloride ion and/or methanol whereby chlorine dioxide is liberated and withdrawn and a residual aqueous solution is produced containing alkali or alkali earth metal ions, comprising the steps of:
   (a) withdrawing the residual solution from the reaction zone and feeding it to a compartment of an electrolytic cell containing at least one membrane between an anode and a cathode, whereby the membrane closest to the anode is permeable to cations when the residual solution is fed to the anode compartment and permeable to anions when the residual solution is fed to a compartment opposite the anode,
   (b) electrolytically producing hydrogen ions in the anode compartment, (c) withdrawing the solution from the anode compartment with, in relation to the residual solution, decreased concentration of the alkali or alkali earth metal ions, (d) feeding at least a part of the so withdrawn anode compartment solution to the reaction zone, and (e) withdrawing a product containing alkali or alkaline earth metal ions from a compartment of the cell other than the anode compartment.

2. The process according to claim 1, characterized in that the electrolytic cell is divided into two compartments by means of an anion selective membrane, said residual solution being introduced into the cathode compartment and said solution that is withdrawn from the anode compartment being an acid enriched fraction.

3. The process according to claim 1, characterized in that the electrolytic cell is divided into two compartments by means of a cation selective membrane, said residual solution being introduced into the anode compartment and said solution that is withdrawn from the anode compartment being an acid enriched fraction.

4. The process according to claim 1, characterized in that the electrolytic cell is divided into three compartments by means of an anion selective membrane adjacent to the anode and a cation selective membrane adjacent to the cathode, the residual solution being introduced into the intermediate compartment that is formed between said two membranes, and said solution that is withdrawn from the anode compartment is an acid enriched fraction.

5. The process according to claim 1, wherein the pH-value of the solution fed to the cell is between 1 and 7.

6. The process according to claim 1 wherein the pH-value of the solution fed to the cell is between 3 and 7.

* * * * *